United States Patent [19]
Knutson et al.

[11] Patent Number: 5,878,088
[45] Date of Patent: Mar. 2, 1999

[54] DIGITAL VARIABLE SYMBOL TIMING RECOVERY SYSTEM FOR QAM

[75] Inventors: Paul Gothard Knutson; Kumar Ramaswamy; David Lowell McNeely, all of Indianapolis, Ind.

[73] Assignee: Thomson Consumer Electronics, Inc., Indianapolis, Ind.

[21] Appl. No.: 835,915

[22] Filed: Apr. 10, 1997

[51] Int. Cl.⁶ ........................... H04L 27/14; H04L 27/16; H04L 27/22; H04L 7/00

[52] U.S. Cl. ........................ 375/324; 375/324; 375/326; 375/355; 375/371; 375/373; 375/260; 375/261; 329/304; 329/306

[58] Field of Search .................................. 375/324, 327, 375/320, 354, 355, 371, 373, 376, 260, 261, 268, 269, 326; 329/304, 306, 307, 308, 347, 348, 363

[56] References Cited

U.S. PATENT DOCUMENTS

| | | | |
|---|---|---|---|
| 5,386,239 | 1/1995 | Wang et al. | 348/472 |
| 5,504,785 | 4/1996 | Becker et al. | 375/344 |
| 5,535,252 | 7/1996 | Kobayashi | 375/371 |
| 5,610,948 | 3/1997 | Ninomiya et al. | 375/324 |
| 5,612,975 | 3/1997 | Becker et al. | 375/319 |
| 5,724,396 | 3/1998 | Claydon et al. | 375/355 |
| 5,793,818 | 8/1998 | Claydon et al. | 375/326 |

OTHER PUBLICATIONS

Edward A. Lee et al., *Digital Communication*, © 1988 by Kluwer Academic Publishers, Chapter 15, pp. 560–586.

Floyd M. Gardner, *Interpolation in Digital Modems—Part I: Fundamentals*, IEEE Transactions on Communications, vol. 41, No. 3, Mar. 1993, pp. 501–507.

Lars Erup et al., *Interpolation in Digital Modems—Part II: Implementation and Performance* IEEE Transactions on Communications, vol. 41, No. 6, Jun. 1993, pp. 998–1008.

Floyd M. Gardner, *A BPSK/QPSK Timing—Error Detector for Sampled Receivers*, IEEE Transactions on Communications, vol. COM–34, No. 5, May 1986, pp. 423–429.

Edward A. Lee et al., *Digital Communication*, Second Edition © 1994 by Kluwer Academic Publishers, Sec.2.4 p. 18 to Sec.6.8 p. 235.

(List continued on next page.)

*Primary Examiner*—Stephen Chin
*Assistant Examiner*—Michael W. Maddox
*Attorney, Agent, or Firm*—Joseph S. Tripoli; Eric P. Herrmann; Ronald H. Kurdyla

[57] ABSTRACT

A receiver is arranged for receiving a transmitted quadrature amplitude modulated (QAM) signal representing successive symbols, and including an in-phase (I) component and a quadrature (Q) component. In such a receiver, a timing recovery system includes a source of samples representing the QAM signal produced at a fixed frequency. A first chain of processing circuitry for the I component includes a first demodulator, coupled to the sample source, for demodulating the I component of the QAM signal to baseband; and a first interpolator, coupled to the first demodulator and responsive to a control signal, for producing I component samples taken at times synchronized to the transmitted symbols. A second chain of processing circuitry for the Q component includes a second demodulator, also coupled to the sample source, for demodulating the Q component of the QAM signal to baseband; and a second interpolator, coupled to the second demodulator and responsive to a control signal, for producing Q component samples taken at times synchronized to the transmitted symbols. A phase error detector is coupled to the first and the second interpolators, and detects the phase error between the sample times of the I and Q component samples from the first and second interpolators and times of the successive transmitter symbols. A summer is coupled to the phase error detector and a source of a nominal delay signal. A numerically controlled delay circuit, is coupled to the summer, for producing the respective control signals for the first and second interpolators.

11 Claims, 8 Drawing Sheets

OTHER PUBLICATIONS

J. J. Werner, *Tutorial on Carrierless AM/PM—Part I—Fundamentals and Digital Cap Transmitters,* Minneapolis, MN, Jun. 23, 1992.

David A. Bryan, *QAM for Terrestrial and Cable Transmission,* IEEE Transactions on Consumer Electronics, vol. 41, No. 3, Aug. 1995, pp. 383–391.

Liu et al., *Simulation and Implementation of US QAM–Based HDTV Channel Decoder,* IEEE Transactions on Consumer Electronics, vol. 39, No. 3, Aug. 1993, pp. 676–683.

Neil K. Jablon, *Joint Blind Equalization, Carrier Recovery, and Timing Recovery for High–Order QAM Signal Constellations,* IEEE Transactions on Signal Processing, vol. 40, No. 6, Jun. 1992, pp. 1383–1397.

DIGITAL VARIABLE SYMBOL TIMING RECOVERY SYSTEM FOR QAM

FIELD OF THE INVENTION

The present invention relates to a timing recovery system suitable for use in a digital signal receiver, such as a cable or satellite television receiver, receiving a quadrature amplitude modulated (QAM) signal.

BACKGROUND OF THE INVENTION

The recovery of data from a transmitted signal containing digital data, such as video and related information, at a digital receiver typically requires the implementation of three functions: timing recovery for symbol synchronization, carrier recovery (frequency demodulation) and equalization. Timing recovery is the process by which the receiver clock (timebase) is synchronized to the transmitter clock. This permits the received signal to be sampled at the optimum point in time to reduce the chance of a slicing error associated with decision-directed processing of received symbol values. In some receivers, the received signal is sampled at a multiple of the transmitter symbol rate. For example, some receivers sample the received signal at twice or four times the transmitter symbol rate. In any event, the sampling clock of the receiver must be synchronized to the symbol clock of the transmitter.

Carrier recovery is the process by which a received RF signal, after being frequency shifted to a lower intermediate frequency passband, is frequency shifted to baseband to permit recovery of the modulating baseband information. Equalization is a process which compensates for the effects of transmission channel disturbances upon the received signal. More specifically, equalization removes intersymbol interference (ISI) caused by transmission channel disturbances. ISI causes the value of a given symbol to be distorted by the values of preceding and following symbols. These and related functions are described in greater detail by Lee and Messerschmitt in Digital Communication (Kluwer Academic Press, Boston, Mass. USA).

Prior receivers required a relatively stable source of a sampling clock signal, yet controllable so that it could be locked to the transmitter symbol clock. Voltage controlled crystal oscillators (VCXOs) were used for this function. The clock signal produced by a VCXO is stable, but controllable over a relatively narrow range, so that it can be locked to the transmitter symbol clock. However, a VCXO is an analog component, so it is relatively expensive, and prone to drift over its lifetime. In addition, if it is necessary to receive signals from different transmitters having different symbol clock frequencies (such as in European satellite systems), it is necessary to have a separate VCXO for each such transmitter, further increasing the cost of the receiver.

An alternative timing recovery system disclosed in U.S. patent application Ser. No. 08/721,780, entitled "Timing Recovery System for a Digital Signal Processor" and filed Sep. 25, 19996 by Knutson et al. operates by sampling a received signal at a fixed frequency slightly higher than twice the highest transmitter symbol rate. These samples are then processed by an interpolator to generate a sequence of time interpolated samples synchronized to the transmitter symbol rate. These interpolated synchronized samples are supplied to a digital phase error detector. The output of the digital phase error detector is supplied to a second order loop filter. A predetermined value, representing a nominal sampling time delay, is added to the output signal of the loop filter. The combination of the predetermined nominal delay and the output signal from the loop filter controls a numerically controlled delay which provides integer and fractional clock delay component signals. The integer clock delay component signal is used to control production of a sampling clock enable signal synchronized to the transmitter symbol rate. This sampling clock enable signal may be further divided in frequency to provide a receiver symbol clock enable signal. The fractional clock delay component signal is applied to a control input of the interpolator so that the sampled signal produced by the interpolator represents the value of the received signal at the desired sampling time.

Such a timing recovery system can be used in systems carrying transmitted symbols QPSK modulated on a carrier. However, such a timing recovery system when arranged for QAM modulation is relatively complex and expensive. The required tolerances between the quadrature signals in a QAM signal with a dense constellation are difficult to meet. Errors introduced into the quadrature signals result in crosstalk between them which cannot be removed or reduced by an equalizer. A timing recovery system which can operate on QAM signals having differing symbol rates without undue complexity and expense is desired.

BRIEF DESCRIPTION OF THE INVENTION

In accordance with principles of the present invention, a receiver is arranged for receiving a transmitted quadrature amplitude modulated (QAM) signal representing successive symbols, and including an in-phase (I) component and a quadrature (Q) component. In such a receiver, a timing recovery system includes a source of samples, representing the QAM signal, produced at a fixed frequency. A first chain of processing circuitry for the I component includes a first demodulator, coupled to the sample source, for demodulating the I component of the QAM signal to baseband; and a first interpolator. coupled to the first demodulator and responsive to a control signal, for producing I component samples taken at times synchronized to the transmitted symbols. A second chain of processing circuitry for the Q component includes a second demodulator, also coupled to the sample source, for demodulating the Q component of the QAM signal to baseband; and a second interpolator, coupled to the second demodulator and responsive to a control signal, for producing Q component samples taken at times synchronized to the transmitted symbols. A phase error detector is coupled to the first and the second interpolators. and detects the phase error between the sample times of the I and Q component samples from the first and second interpolators and times of the successive transmitter symbols. A summer is coupled to the phase error detector and a source of a nominal delay signal. A numerically controlled delay circuit, is coupled to the summer, for producing the respective control signals for the first and second interpolators.

DETAILED DESCRIPTION

Figure 1:
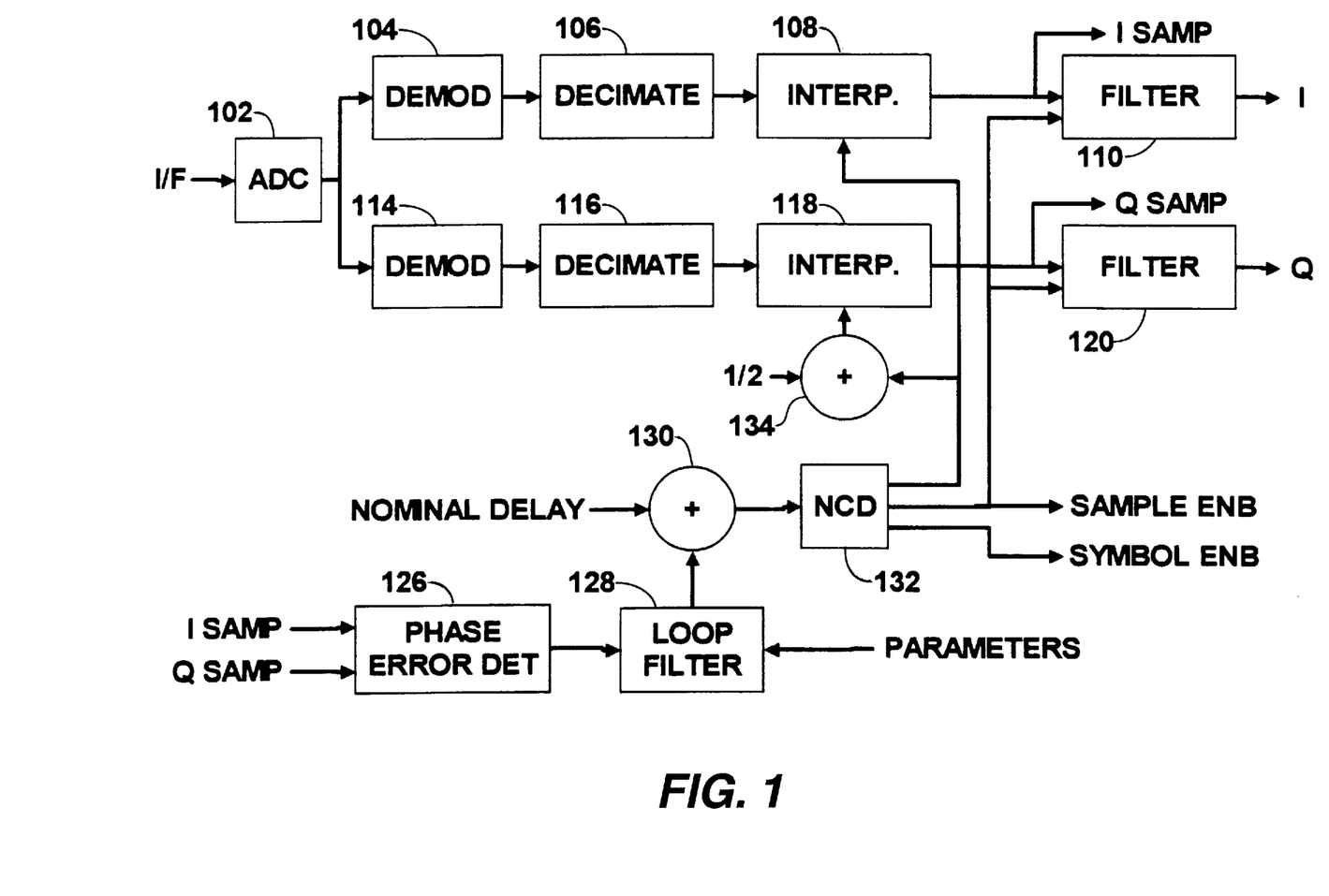
FIG. 1 is a block diagram of a QAM symbol timing recovery system according to the present invention.

FIG. 1 is a block diagram of a QAM symbol timing recovery system according to the present invention. In FIG. 1, a receiver front end (not shown) includes e.g. a radio-frequency (RF) tuner, downconverter and intermediate-frequency (IF) amplifier arranged in a known manner and producing an IF signal on which the QAM data signal is modulated. The receiver front end is coupled to an input terminal of an analog-to-digital converter (ADC) 102. An output terminal of the ADC 102 is coupled to respective input terminals of a in-phase component (I) demodulator 104 and a quadrature component (Q) demodulator 114. An output terminal of the I demodulator 104 is coupled to an input terminal of an I decimator 106, and an output terminal of the I decimator 106 is coupled to a data input terminal of an I interpolator 108. An output terminal of the I interpolator 108 produces a sequence of samples representing the I QAM component (I SAMP), and is coupled to a data input terminal of an I pulse shaping filter 110. An output terminal of the I pulse shaping filter is coupled to downstream receiver circuitry, which includes e.g. an adaptive equalizer, slicer, and signal utilization circuitry arranged in a known manner.

An output terminal of the Q demodulator 114 is coupled to an input terminal of a Q decimator 116, and an output terminal of the Q decimator 116 is coupled to a data input terminal of a Q interpolator 118. An output terminal of the Q interpolator 118 produces a sequence of samples representing the Q QAM component (Q SAMP), and is coupled to a data input terminal of a Q pulse shaping filter 120. An output terminal of the Q pulse shaping filter 120 is also coupled to the downstream receiver circuitry.

The output terminal of the I interpolator 108 (I SAMP), and the output terminal of the Q interpolator 118 (Q SAMP) are coupled to respective input terminals of a phase error detector 126. An output terminal of the phase error detector 126 is coupled to a data input terminal of a loop filter 128. An output terminal of the loop filter 128 is coupled to a first input terminal of a first adder 130. An output terminal of the first adder 130 is coupled to an input terminal of a numerically controlled delay circuit 132. The numerically controlled delay (NCD) circuit operates in a manner to be described in more detail below. A control input terminal of the loop filter 128 is coupled to a source of filter parameters, to be described in more detail below.

A first output terminal of the NCD circuit 132 produces a signal representing the time location of the next transmitter synchronized sample between two adjacent samples from the I and Q decimators 108 and 118, respectively. The first output terminal of the NCD circuit 132 is coupled to a control input terminal of the I interpolator 108, and a first input terminal of a second adder 134. An output terminal of the second adder 134 is coupled to a control input terminal of the Q interpolator 118. A second input terminal of the first adder 130 receives a signal representing a nominal time delay between transmitter synchronized samples. A second input terminal of the second adder 134 receives a signal representing ½ of a receiver interpolated sample clock cycle.

A second output terminal from the NCD circuit 132 produces a signal SAMPLE ENB indicating that a transmitter synchronized sample is presently available at the outputs of the I and Q interpolators 108 and 118, respectively. This signal is used to enable downstream circuitry, such as the pulse shaping filters 110 and 120, respectively, which operate synchronously on transmitter synchronized samples. A third output terminal from the NCD circuit 132 produces a signal SYMBOL ENB indicating that a transmitter synchronized sample corresponding to a transmitted symbol is presently available at the outputs of the I and Q interpolators 108 and 118, respectively. This signal is used to enable downstream circuitry, such as the slicer, which operate synchronously on transmitter synchronized symbol representative samples.

In operation, the ADC 102 generates samples at a fixed rate of at least 4 times the expected IF center frequency, which, for example, would be 29 MHZ for Europe and 22 MHZ for the United States. These ADC 102 samples are then demodulated in the I demodulator 104 and Q demodulator 114, respectively, by 0, +1, 0, −1 demodulation, to generate respective I and Q baseband received sample sequences representing the I and Q QAM components, respectively. These sample sequences, however, are not synchronized to the transmitter symbol times. In addition, the samples in the I channel are advanced one ADC 102 sample from those in the Q channel. These sample sequences are decimated in respective I and Q decimators, 106 and 116, to generate respective I and Q sample sequences each at a baseband sample frequency of ½ the ADC 102 sample frequency.

The NCD circuit 132 produces a fixed point multibit digital signal, representing the instantaneous time to the next transmitter synchronized sample, expressed in terms of a number of baseband sample clock cycles (which have a frequency of ½ the ADC 102 sample clock frequency). An integer portion of this delay representative signal represents a number of complete cycles of the baseband sample clock period to the next transmitter synchronized sample. A fractional portion of this delay representative signal represents an additional fraction of a baseband sample clock period to the next transmitter synchronized sample. The value of the delay representative signal from the NCD circuit 132 is continually adjusted by the cooperative action of the phase error detector 126 (responsive to the I and Q sample sequences from the I and Q interpolators 108 and 118), the loop filter 128 and the adder 130 to synchronize the baseband samples to the transmitter symbol times, in a manner to be described in more detail below.

The I interpolator 108 receives a control signal which is the fractional portion of the delay representative signal from the NCD circuit 132. and the Q interpolator 118 receives a control signal which is the fractional portion of the delay representative signal from the NCD circuit 132 adjusted to compensate for the time displacement of the received Q sample from the I sample by the second adder 134. The respective I and Q interpolators 108 and 118 produce samples at each receiver baseband sample time which represent an interpolated sample occurring at the fraction of the receiver baseband sample period between two adjacent decimated samples represented by the fractional portion of the delay representative signal.

Not every one of the interpolated samples produced by the I and Q interpolators represents a transmitter synchronized sample, however. The NCD circuit 132 includes further circuitry, described in more detail below, which processes a current value of the delay representative signal and the time location of the preceding sample and determines the receiver sample time at which the respective I and Q interpolators 108 and 118 will produce an interpolated sample which is synchronized with the transmitter symbols times. The sample enable signal (SAMPLE ENB) is activated at this time. This signal may be used by downstream circuitry which synchronously processes receiver samples (e.g. the respective pulse shaping filters 110 and 120) to enable processing of those samples, and disable processing of those intermediate samples which are produced by the respective interpolators 108 and 118, but are not synchronized to the transmitter symbol times.

Similarly, in the illustrated embodiment, the receiver samples the signal at twice the transmitter symbol rate. Thus, only every other receiver sample represents a transmitter symbol. The NCD circuit 132 includes further circuitry, again described in more detail below, which generates an enable signal (SYMBOL ENB) which is activated when a receiver sample is synchronized to the transmitter symbol. Downstream circuitry which synchronously processes transmitter symbols (e.g. slicer circuitry, not shown) may use this enable signal to enable processing of those samples representing transmitter symbols and disable processing of the rest.

Figure 2:
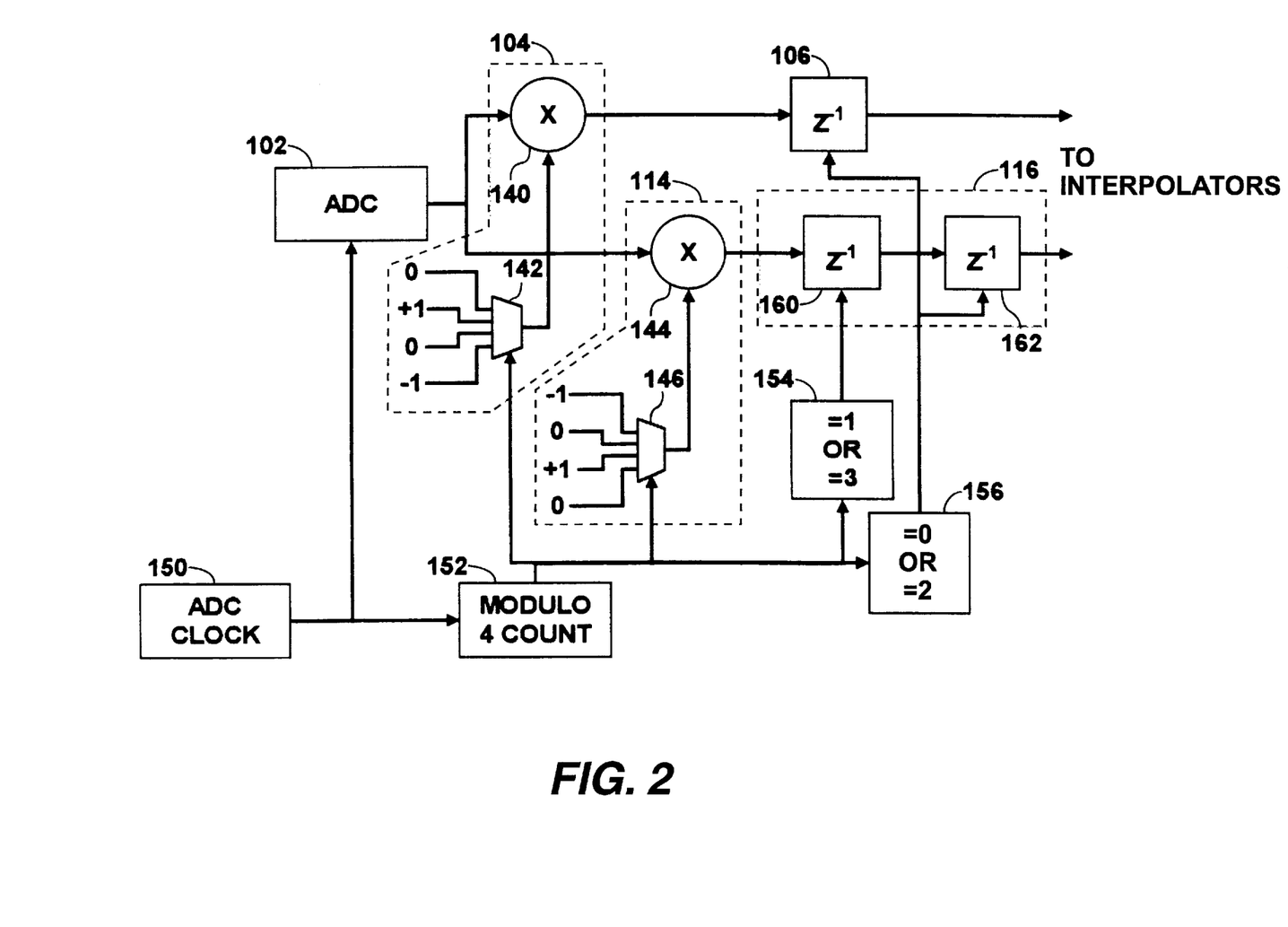
FIG. 2 is a more detailed block diagram illustrating the demodulation and decimation circuitry illustrated in FIG. 1.

FIG. 2 is a more detailed block diagram illustrating the demodulation circuitry (104 and 114) and decimation circuitry (106 and 116) illustrated in FIG. 1. In FIG. 2, elements which are the same as those illustrated in FIG. 1 are designated by the same reference number and are not described in detail. In FIG. 2, an output terminal of an ADC clock generator 150 is coupled to respective clock signal input terminals of the ADC 102 and a modulo-4 counter 152. A 2-bit output terminal of the modulo-4 counter 152, is coupled to respective input terminals of a first four input multiplexer 142, a second four input multiplexer 146, a first gating circuit 154 and a second gating circuit 156.

Respective data input terminals of the first four input multiplexer 142 receive data signals having values of 0, +1, 0 and -1. An output terminal of the first four input multiplexer 142 is coupled to a first input terminal of a first multiplier 140. The output terminal of the ADC 102 is coupled to a second input terminal of the first multiplier 140. The combination of the first multiplexer 142 and the first multiplier 140 forms the I demodulator 104. Respective data input terminals of the second four input multiplexer 146 receive data signals having values of -1 0, +1 and 0. An output terminal of the second four input multiplexer 146 is coupled to a first input terminal of a second multiplier 144. The output terminal of the ADC 102 is coupled to a second input terminal of the second multiplier 144. The combination of the second multiplexer 146 and the second multiplier 144 forms the Q demodulator 114.

An output terminal of the first multiplier 140 is coupled to an input terminal of a first synchronous delay circuit 106, which operates as the I decimator 106 (of FIG. 1). A clock input terminal of the first delay circuit 106 is coupled to the output terminal of the ADC clock generator 150 (not shown to simplify the figure), and an output terminal of the second gating circuit 156 is coupled to an enable input terminal of the first delay circuit 106.

An output terminal of the second multiplier 144 is coupled to an input terminal of a second synchronous delay circuit 160. An output terminal of the second delay circuit 160 is coupled to an input terminal of a third synchronous delay circuit 162. The output terminal of the ADC clock signal generator 150 is coupled to respective clock input terminals of the second delay circuit 160 and the third delay circuit 162 (not shown to simplify the figure). An output terminal of the first gating circuit 154 is coupled to an enable input terminal of the second delay circuit 160, and the output terminal of the second gating circuit 156 is coupled to an enable input terminal of the third delay circuit 162. The combination of the second delay circuit 160 and the third delay circuit 162 form the Q decimator 116 (of FIG. 1).

In operation, the ADC clock signal generator 150 produces a fixed frequency clock signal having a frequency of at least four times the highest expected transmitter symbol rate. The ADC clock signal generator 150 may be a crystal controlled oscillator of a known design. The ADC clock signal is supplied directly to the ADC 102 and the modulo 4 counter 152, and to the clock input terminals of the first, second and third delay circuits, which are further responsive to enable signals, as described above. The ADC clock signal may also be supplied to other downstream circuitry (not shown).

The value of the output signal of the modulo 4 counter continually repeats the sequence: 0, 1, 2, 3; and controls the first and second multiplexers 142 and 146, respectively. In the illustrated embodiment, when the value of the control signal is 0, the lowermost input terminal of the respective multiplexers 142 and 146 are coupled to the output terminal. When the value of the control signal is 1, the next higher input terminal is coupled to the output terminal; when the control signal is 2, the next higher input terminal is coupled to the output terminal; and when the value is 3, the topmost input terminal is coupled to the output terminal. Thus, the first multiplexer 142 generates a sequence: -1, 0, +1, 0, while the second multiplexer 146 simultaneously generates the sequence 0, +1, 0, -1. These sequences supplied to the respective first and second multipliers 140 and 144 will demodulate the QAM IF representative samples from the ADC 102 to baseband.

Every other sample produced by the respective first and second multipliers 140 and 144 is a zero valued sample. For example, referring to the first multiplier 140, when the value of the output signal from the modulo 4 counter 152 is 0 or 2, the output of the first multiplier 140 is non-zero; and when the output signal from the modulo 4 counter 152 is 1 or 3, the output of the first multiplier 140 is zero. The first delay circuit 106 is clocked by the ADC clock signal, and enabled by the output signal from the second gating circuit 156. The second gating circuit 156 produces an enable signal only when the value of the output signal from the modulo 4 counter 152 is 0 or 2. Thus, the first delay circuit 106 latches only non-zero samples from the first multiplier 140, decimating the I sample stream. In a similar manner, the first gating circuit 154 produces an enable signal only when the value of the output signal from the modulo 4 counter 152 is 1 or 3, and the second delay circuit 160 latches only non-zero samples from the second multiplier 144, decimating the Q sample stream. The third delay circuit 162 is clocked by the ADC clock signal and enabled by the enable signal from the second gating circuit 156. This temporally aligns the respective decimated I and Q sample streams.

Figure 3:
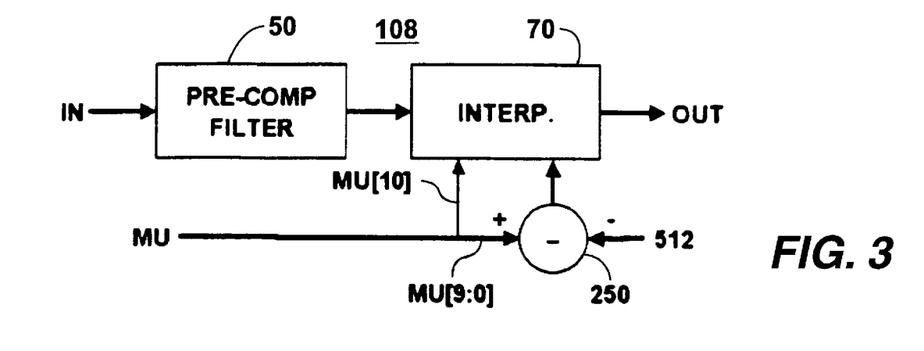
FIG. 3 is a more detailed block diagram illustrating an overview of an interpolator which may be used in the system illustrated in FIG. 1.

FIG. 3 is a more detailed block diagram illustrating an overview of an interpolator which may be used for the I and/or Q interpolators, 108 and/or 118, respectively, in the system illustrated in FIG. 1. In the embodiment illustrated in FIG. 3, the I interpolator 108 is illustrated. In transmission systems using QPSK modulation or QAM modulation with relatively small constellations, such as 16 point QAM systems, a Farrow architecture piecewise parabolic interpolator implemented in fixed point arithmetic for hardware design may be used. In such systems, such a piecewise parabolic filter may be used because it provides a low complexity interpolator with adequate performance.

However, in transmission systems using QAM modulation with relatively large constellations, such as 64 or 128 point QAM modulation, more precision is required in the interpolators to prevent unrecoverable crosstalk between the in-phase and quadrature components. In addition, the interpolator must be able to perform an integer cycle delay adjustment. This is because a fixed delay period of ½ is added to the interpolator control signal MU for the Q interpolator 118 by adder 134 of FIG. 1; and because the interpolator control signal represents a interpolation value of from 0 to 1 interpolator sample delay period, the interpolators must be capable of interpolating from 0 to 1½ interpolator sample delay periods.

In FIG. 3, an input terminal IN is coupled to the output terminal of the I decimator 106 (of FIG. 1). The input terminal IN is coupled to a series connection of a precompensation filter 50 and an interpolation circuit 70. An output terminal of the interpolation circuit 70 is coupled to the input terminal of the I matched filter 110. An interpolator control signal input terminal MU is coupled to the NCD circuit 132 (via the adder 134 in the case of the Q interpolator 118). The most significant bit of the interpolator control signal MU is coupled to the interpolation circuit 70. The least significant bits of the interpolator control signal input terminal MU is coupled to the subtrahend input terminal of a subtractor 250. A minuend input terminal of the subtractor 250 is coupled to a source of a signal having the value 512. An output terminal of the subtractor 250 is coupled to an input terminal of the interpolation circuit 70.

In operation, the interpolator control signal from the NCD circuit 132 is a 10 bit signal, having values between 0 and 1023, representing the desired time location of the interpolated sample between two decimated sample times. Thus, in the illustrated embodiment, the time interval between decimated samples is divided into 1024 parts. In the case of the I interpolator 108, this signal is padded with a '0' valued most significant bit, and the interpolator control signal MU is an 11 bit signal received otherwise unchanged from the NCD circuit 132 (of FIG. 1). In the case of the Q interpolator 118, however, in adder 134 (of FIG. 1) a signal having the value representing ½ the decimated sample period is added to the interpolator control signal from the NCD circuit 132. In the illustrated embodiment, that signal has the value of 512. Thus, the interpolator control signal MU at the Q interpolator 118 is an 11 bit signal having values between 512 and 1535. Before being supplied to the interpolation circuit 70, the received interpolator control signal MU is converted to two's complement form by subtracting 512 from it in subtractor 250.

The combination of the precompensation filter 50 and the interpolation circuit 70 generate interpolated samples at an intermediate time location between decimated sample times, as controlled by the interpolator control signal MU, in a manner to be described in more detail below.

Figure 4:
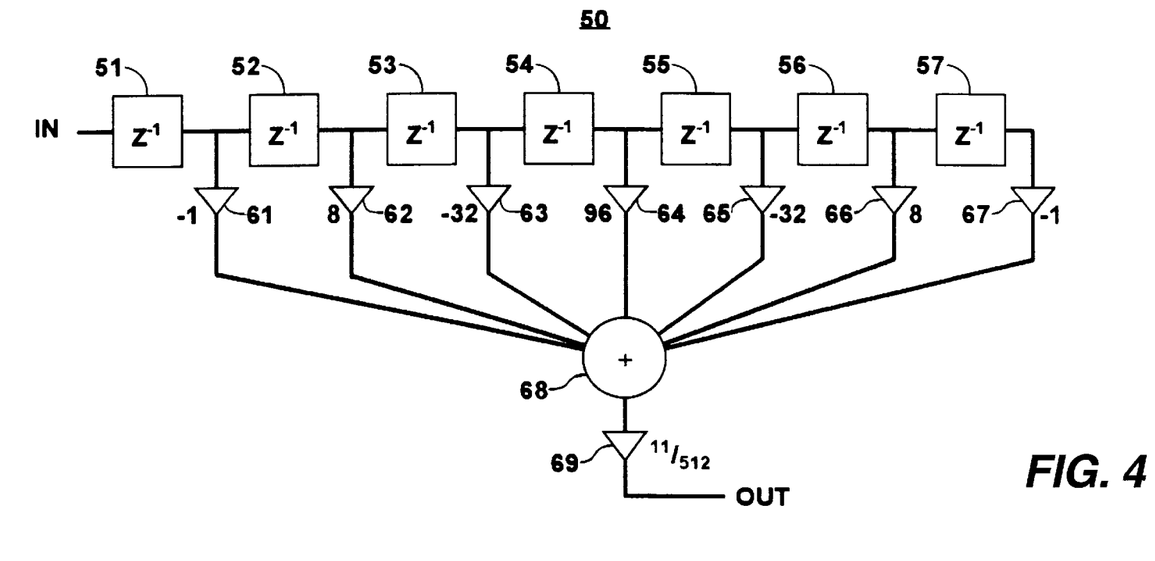
FIG. 4 is a block diagram of a precompensation filter used in the interpolator illustrated in FIG. 3.

FIG. 4 is a block diagram of a precompensation filter 50 used in the interpolator 108 illustrated in FIG. 3. An input terminal of the precompensation filter is coupled to the I decimator 106 (of FIG. 1). The input terminal IN is coupled to a series connection of delay circuits 51 through 57. Respective output terminals of the delay circuits 51 through 57 are coupled to input terminals of corresponding tap weighting circuits 61 through 67. The weights of the tap weighting circuits 61 through 67 are: −1, 8, −32, 96, −32, 8, and −1, respectively. Respective output terminals of the tap weighting circuits 61 through 67 are coupled to corresponding input terminals of an adder 68. An output terminal of the adder 68 is coupled to an input terminal of a normalization weighting circuit 69, having a weight of $^{11}/_{512}$. An output terminal of the normalization weighting circuit 69 is coupled to the input terminal of the interpolation circuit 70 (of FIG. 3). The precompensation filter 50 operates in a known manner to provide the precompensation for frequency distortion introduced by the interpolation circuit 70.

Figure 5:
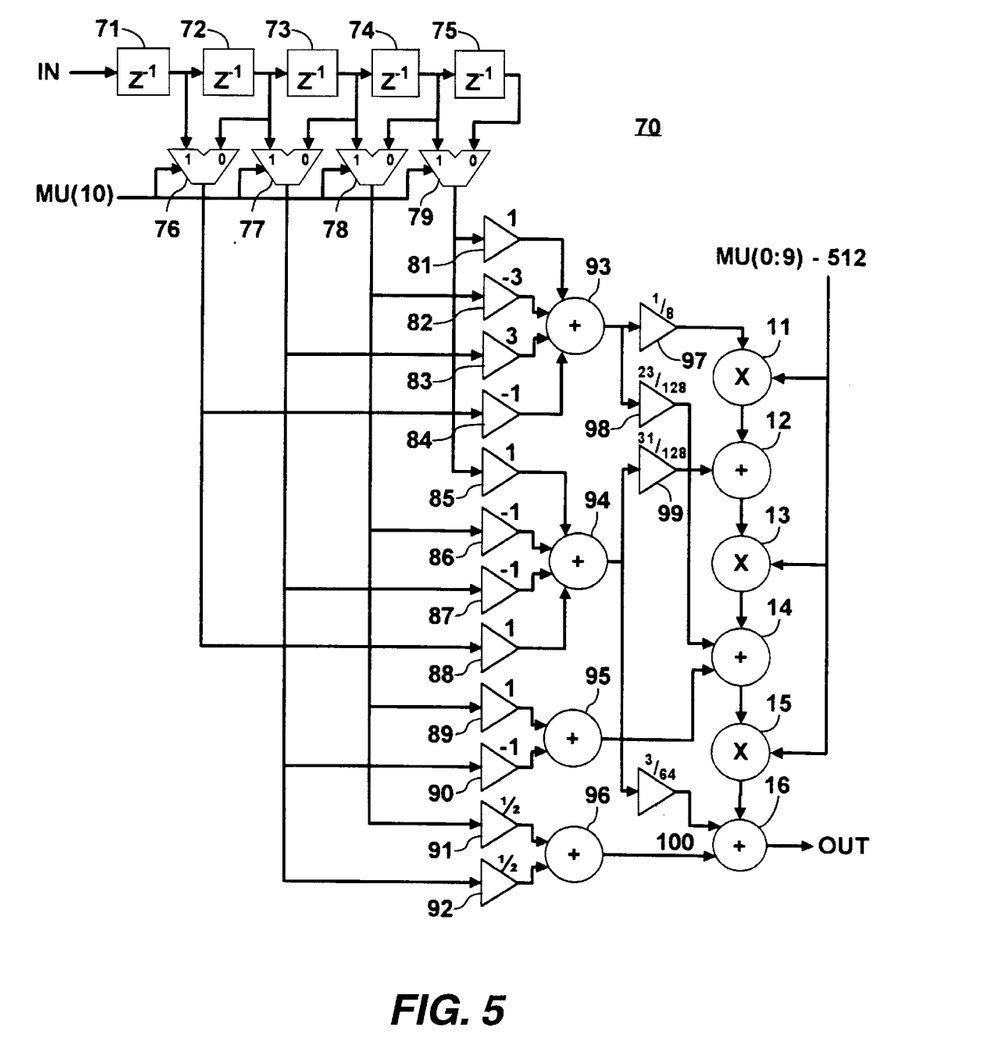
FIG. 5 is a block diagram of an interpolation circuit used in the interpolator illustrated in FIG. 3.

FIG. 5 is a block diagram of an interpolation circuit 70 used in the interpolator 108 illustrated in FIG. 3. In FIG. 5, an input terminal IN is coupled to the output terminal of the precompensation filter 50 (of FIG. 3). The input terminal IN is coupled to a series connection of delay circuits 71 through 75. An output terminal of delay circuit 71 is coupled to a '1' input terminal of a first multiplexer 76. An output terminal of the delay circuit 72 is coupled to a '0' input terminal of the first multiplexer 76 and to a '1' input terminal of a second multiplexer 77. An output terminal of the delay circuit 73 is coupled to a '0' input terminal of the second multiplexer 77 and to a '1' input terminal of a third multiplexer 78. An output terminal of the delay circuit 74 is coupled to a '0' input terminal of the third multiplexer 78 and to a '1' input terminal of a fourth multiplexer 79. An output terminal of the delay circuit 75 is coupled to a '0' input terminal of the fourth multiplexer 79. The most significant of the interpolator control signal MU (MU(10)) is coupled in common to respective control terminals of the first, second, third and fourth multiplexers 76 through 79.

An output terminal of the first multiplexer 76 is coupled to respective input terminals of weighting circuits 84 and 88, having weights of −1 and 1, respectively. An output terminal of the second multiplexer 77 is coupled to respective input terminals of weighting circuits 83, 87, 90 and 92, having weights of 3, −1, −1 and ½, respectively. An output terminal of the third multiplexer 78 is coupled to respective input terminals of weighting circuits 82, 86, 89 and 91. having weights of −3, −1, 1 and ½, respectively. An output terminal of the fourth multiplexer 79 is coupled to respective input terminals of weighting circuits 81 and 85, having weights of 1 and 1, respectively.

Respective output terminals of weighting circuits 81 through 84 are coupled to corresponding input terminals of an adder 93. Respective output terminals of weighting circuits 85 through 88 are coupled to corresponding input terminals of an adder 94. Respective output terminals of weighting circuits 89 and 90 are coupled to corresponding input terminals of an adder 95, and respective output terminals of weighting circuits 91 and 92 are coupled to corresponding input terminals of adder 96.

An output terminal of adder 93 is coupled to respective input terminals of weighting circuits 97 and 98, having weights of $^{1}/_{8}$ and $^{23}/_{128}$, respectively, and an output terminal of adder 94 is coupled to respective input terminals of weighting circuits 99 and 100, having weights of $^{31}/_{128}$ and $^{3}/_{64}$, respectively. An output terminal of weighting circuit 97 is coupled to a first input terminal of a multiplier 11. An output terminal of multiplier 11 is coupled to a first input terminal of an adder 12. A second input terminal of adder 12 is coupled to an output terminal of the weighting circuit 99. An output terminal of the adder 12 is coupled to a first input terminal of a multiplier 13. An output terminal of the multiplier 13 is coupled to a first input terminal of an adder 14. A second input terminal of the adder 14 is coupled to an output terminal of the weighting circuit 98, and a third input terminal of the adder 14 is coupled to an output terminal of the adder 95. An output terminal of the adder 14 is coupled to a first input terminal of a multiplier 15. An output terminal of the multiplier 15 is coupled to a first input terminal of an adder 16. A second input terminal of the adder 16 is coupled to an output terminal of the weighting circuit 100, and a third input terminal of the adder 16 is coupled to an output terminal of the adder 96. An output terminal of the adder 16 produces the interpolated I sample, and is coupled to an input terminal of the I matched filter 110 (of FIG. 1). The 10 least significant bits of the interpolator control signal, from the subtractor 250 (of FIG. 3) is coupled to respective second input terminals of multipliers 11, 13, and 15.

In operation, the delay circuits 71 through 75 retain decimated samples from which the interpolated sample is calculated. The multiplexers 76 through 79 operate to adjust for the possibility of an integer interpolation delay period (in the Q interpolator 118). As described above, in the I interpolator 108, this is not a possibility, and the eleventh, most significant bit of the interpolator control signal MU is always '0' valued. In the case of the Q interpolator 118, however, the value of the interpolator control signal can represent values from ½ to 1½ of a decimated sample delay. When the interpolator delay value is less than 1, then the most significant bit of the interpolator control signal MU is a logic '0' signal, as with the I interpolator 108. However, when the delay value is greater than one, then the most significant bit of the interpolator control signal MU (i.e. MU(10)) is a logic '1' signal.

When the most significant bit of the interpolator control signal MU (MU(10)) is a logic '0' signal, the '0' input terminals of the multiplexers 76 through 79 are coupled to their output terminals, and when the most significant bit of the interpolator control signal MU (MU(10)) is a logic '1' signal, the '1' input terminals of the multiplexers 76 through 79 are coupled to their output terminals. Thus, when the interpolator delay is less than 1 (i.e. MU(10) is '0'), the output terminals of delay circuits 72 through 75 are coupled to input terminals of the weighting circuits 81 through 92 to be interpolated. When the interpolator delay is 1 or greater (i.e. MU(10) is '1') the output terminals of delay circuits 71 through 74 are coupled to the input terminals of the weighting circuits 81 through 92 to be interpolated. This compensates for the possibility of an integer interpolator delay in the Q interpolator 118. It is possible to implement the I interpolator without the multiplexers 76 through 79. Instead the respective output terminals of the delay circuits 72 through 75 are coupled directly to the input terminals of the corresponding weighting circuits, as illustrated in FIG. 5.

The combination of the weighting circuits 81 through 92, adders 93 through 96, weighting circuits 97 through 100, and the series of multipliers and adders 11 through 16, provide interpolation under the control of the two's complement control signal (MU(0:9)—512), from the subtractor 250, in a known manner. One skilled in the art will understand that the precompensation filter 50 illustrated in FIG. 4 and/or the interpolator 70 illustrated in FIG. 5 can be implemented with a pipelined architecture to provide the required throughput without changing the response characteristics of the precompensation filter 50 or the interpolator 70. In addition, the precompensation filter 50 would be implemented in transposed form.

One skilled in the art will also understand that it is possible to fabricate a filter having a group delay of n−½ decimated sample periods. Such a filter would be concatenated with the Q interpolation circuit 118 of FIG. 1, and a corresponding delay of n decimated sample periods would be concatenated to the I interpolator 108. The filter would impose a delay of n−½ decimated sample periods, and would obviate the need for the adder 134 (of FIG. 1) and the multiplexers 76 through 79. The corresponding delay could be implemented in the precompensation filter 50 for the I interpolator 108.

Figure 6:
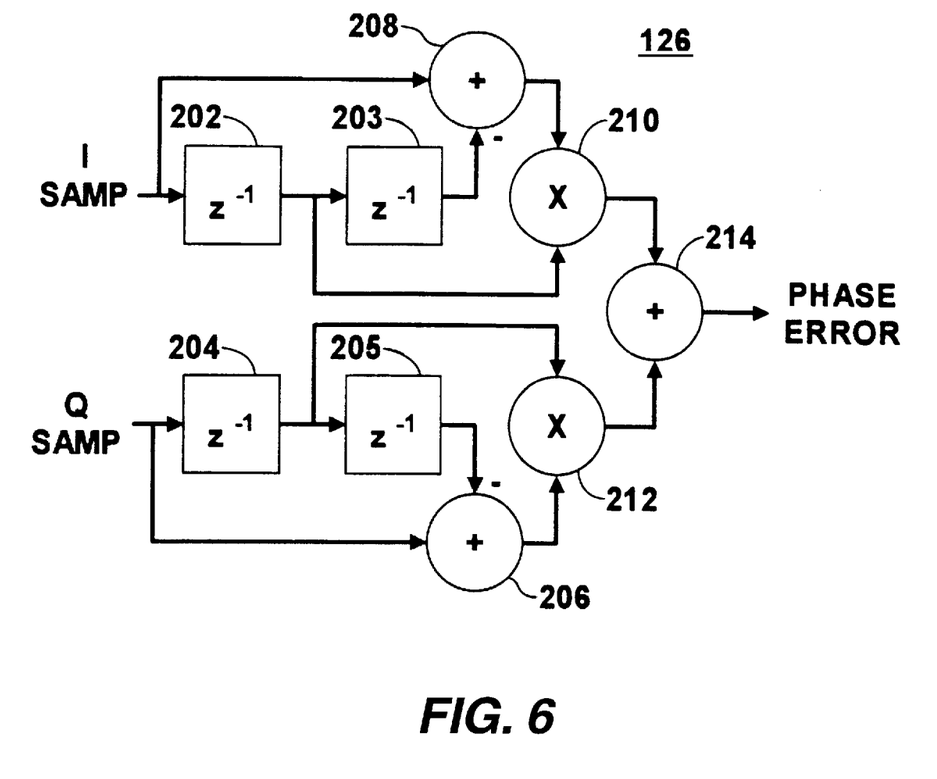
FIG. 6 is a more detailed block diagram of a phase error detector illustrated in FIG. 1.

FIG. 6 is a more detailed block diagram of a phase error detector 126 illustrated in FIG. 1. In FIG. 4, an I sample input terminal (I SAMP) is coupled to the output terminal of the I interpolator 108, and a Q sample input terminal (Q SAMP) is coupled to the output terminal of the Q interpolator 118 (of FIG. 1). The I SAMP input terminal is coupled to a series connection of a delay element 202, a delay element 203 and an inverting input terminal of a summer 208. The I SAMP input terminal is also coupled a second input terminal of the summer 208. An output terminal of the summer 208 is coupled to a first input terminal of a multiplier 210. and an output terminal of the delay element 202 is also coupled to a second input terminal of the multiplier 210. An output terminal of the multiplier 210 is coupled to a first input terminal of a summer 214.

The Q SAMP input terminal is coupled to a series connection of a delay element 204, a delay element 205 and an inverting input terminal of a summer 206. The Q SAMP input terminal is also coupled to a second input terminal of the summer 206. An output terminal of the summer 206 is coupled to a first input terminal of a multiplier 212, and an output terminal of the delay element 204 is also coupled to a second input terminal of the multiplier 212. An output terminal of the multiplier 212 is coupled to a second input terminal of the summer 214. An output terminal of the summer 214 produces a signal representing the phase error between the transmitter synchronized sampling signals generated by the NCD circuit 132 in the receiver, and the actual sampling time of the transmitted signal, all in a known manner.

Figure 7:
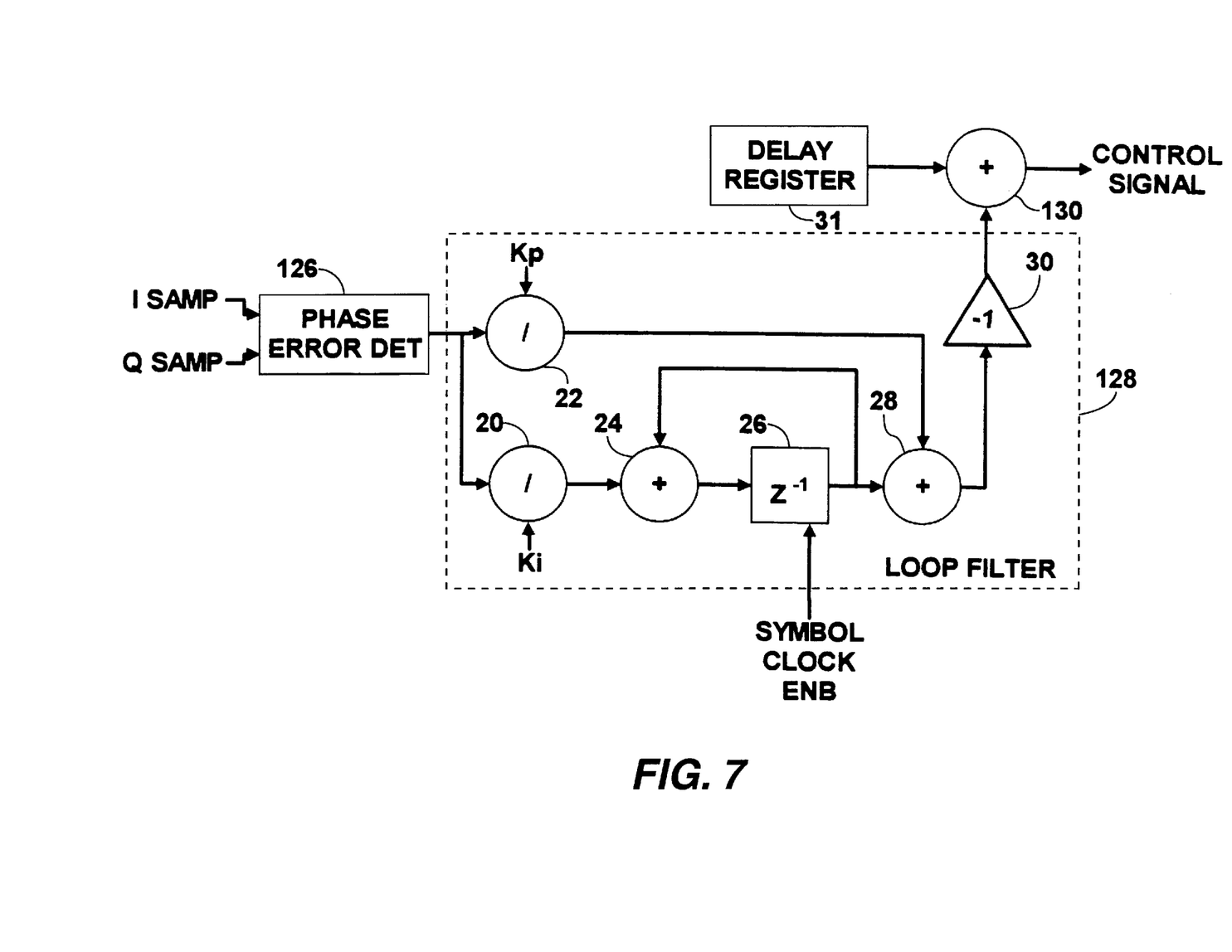
FIG. 7 is a more detailed block diagram of the phase error signal detector illustrated in FIG. 1.

FIG. 7 is a more detailed block diagram of the loop filter 128, illustrated in FIG. 1. The output of phase error detector 126 (of FIG. 6) is coupled to respective dividers 20 and 22, which in the illustrated embodiment are implemented as barrel shifters. A filter loop integral constant Ki is applied to shifter 20, and a loop proportional constant Kp is applied to shifter 22. The values of the loop integral constant Ki and the loop proportional constant Kp are calculated by a system microprocessor (not shown) in a known manner and supplied to the dividers 20 and 22 respectively via respective registers (also not shown) set by the microprocessor.

The output of divider 20 is coupled to a first input terminal of an adder 24. The output of adder 24 is coupled to an input terminal of a delay unit 26 which is clocked by the ADC clock signal from the ADC clock signal generator 150 (of FIG. 2) as enabled by the symbol clock enable signal from the NCD circuit 132 (of FIG. 1). The output of the delay unit 26 is coupled to a second input terminal of the adder 24 and a first input terminal of an adder 28. The signal from divider 20 is summed in adder 24 with a delayed version of that signal from the delay 26. The output terminal of the divider 22 is coupled to a second input terminal of the adder 28. The signal from delay unit 26 is summed in adder 28 with the output of divider 22. The output of adder 28 is inverted with unity gain by inverter unit 30. The first and second dividers, 20 and 22, the adders 24 and 28, the delay unit 26 and the inverter unit 30, in combination, form the second order loop filter 128. The output of the inverter unit 30 forms the output of the loop filter 128. This output represents the phase difference between the interpolated I samples times and the ideal sampling time synchronized to the transmitter clock.

A nominal delay register 31 receives a value from the system microprocessor (not shown) representing a nominal or expected time delay between transmitter synchronized decimated I sampling times. This nominal delay value is calculated by the system microprocessor in a manner to be described in more detail below. In the illustrated embodiment, the received signal is sampled at twice the symbol rate, so the nominal delay between the sampling signals is one half the expected interval between transmitted symbols. The output of the nominal delay register 31 is coupled to a first input terminal of a summer 130. The output of the loop filter 128 is summed with the predetermined nominal delay value in summer 130. The output signal from summer 130 is a digital signal which represents the instantaneous time between samples as synchronized with the transmitter symbol clock. The nominal delay register 31 is provided to allow the receiver timing loop to initially closely approximate the incoming symbol rate in order to speed acquisition. The pull-in range of the system is limited only by the characteristics of the phase error detector 126.

The value of the signal from summer 130 is a fixed point number expressed in terms of a number of decimated I sample periods, which, in turn, is twice the ADC sample period, and contains an integer portion representing the number of full I sample periods between transmitter synchronized sampling times, and a fractional portion, representing the sampling time between two adjacent I samples. In the illustrated embodiment, the digital signal from the summer 130 is a 26-bit fixed point digital signal with the two most significant bits carrying the integer portion and the remaining bits carrying the fractional portion. The system microprocessor inserts a value into the nominal delay register 31 in the following manner. First the nominal delay register 31 has a logical '1' valued signal inserted into it. Then that signal is shifted left 24 places. This places a logic '1' signal in the least significant bit of the integer portion. This may be expressed by the digital logic expression:

$$1 \ll RS-IS \quad (1)$$

where RS is the nominal delay register size, e.g. 26 bits in the illustrated embodiment, and IS is the size of the integer portion, e.g. 2 bits in the present embodiment. In the illustrated embodiment this expression becomes:

$$1 \ll (26-2) \quad (2)$$

Then, a calculation is made by the system microprocessor to determine the nominal delay between transmitter synchronized samples expressed as a number of fixed frequency decimated I sample clock periods:

$$D = FR/(2 \times S) \quad (3)$$

where D is the nominal delay between transmitter synchronized samples expressed as a number of fixed frequency decimated I sample periods, FR is the fixed frequency decimated I sample frequency, and S is the transmitter symbol frequency. The result of this calculation is combined with the previous contents of the nominal delay register 31. In order to compensate for the value '1' already inserted into the nominal delay register 31 by the results of expressions (1) and/or (2), the value 1 must be subtracted from the nominal delay value D calculated in equation (3). Thus, the expression describing the nominal delay value placed in the nominal delay register 31 by the system microprocessor (of FIG. 1) is:

$$DR_{31} = (1 \ll (26-2)) \times ((FR/(2 \times S))-1) \quad (4)$$

where $DR_{31}$ is the value stored in nominal delay register 31 by the system microprocessor. The 26 bit control signal generated at the output terminal of the adder 130 is supplied to the input terminal of the NCD circuit 132 (of FIG. 1).

Figure 8:
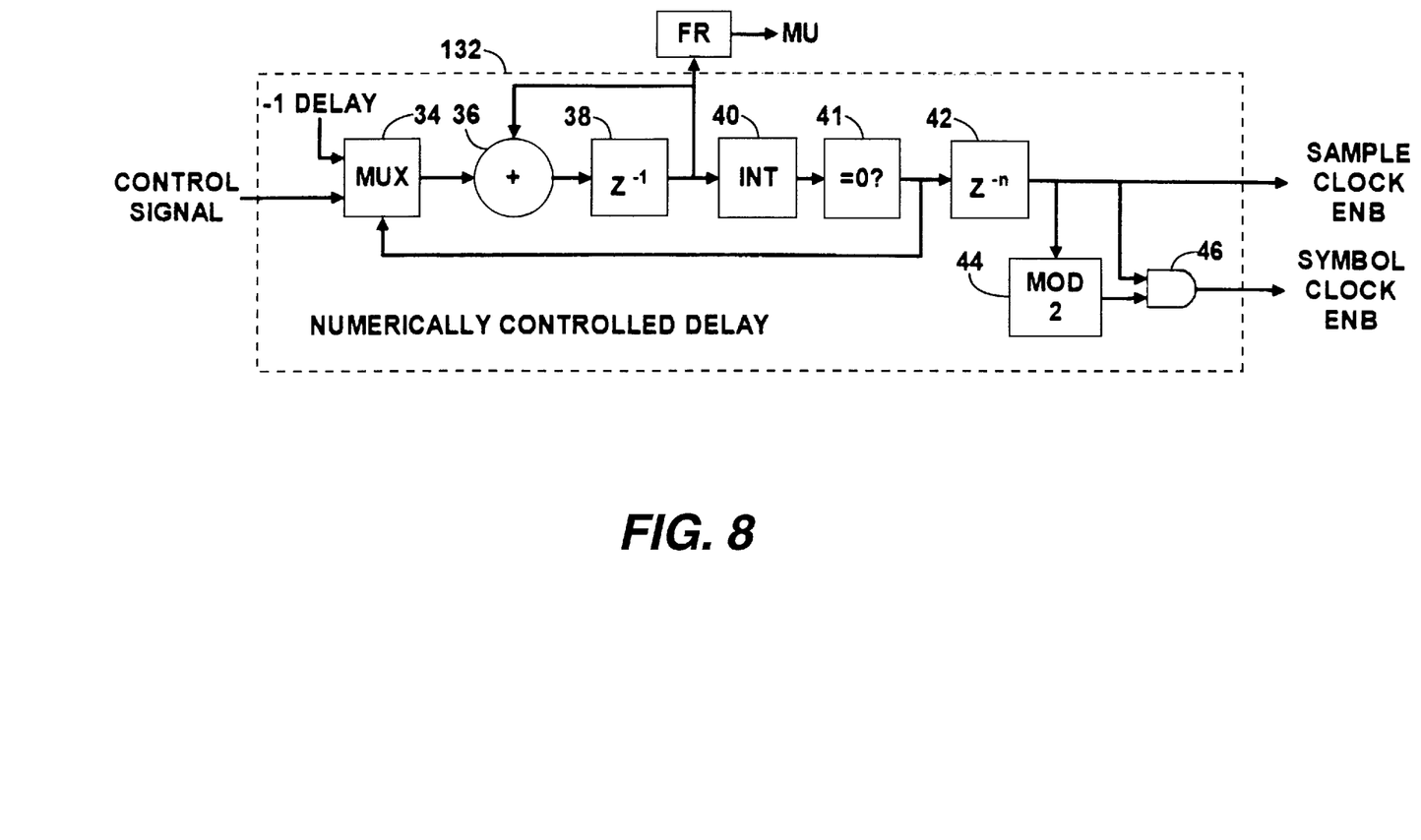
FIG. 8 is a more detailed block diagram of the numerically controlled delay circuit illustrated in FIG. 1.

FIG. 8 is a more detailed block diagram of the NCD circuit 132 illustrated in FIG. 1. The control signal from adder 130 (of FIG. 1) is applied to one input terminal of a multiplexer 34. The other multiplexer input terminal receives a value representing a value of –1. An adder 36 has a first input terminal coupled to the output of multiplexer 34. The output terminal of adder 36 is coupled to a delay unit 38 which functions as an accumulator. The accumulator 38 is clocked by ADC clock signal, as enabled by the fixed frequency decimated sample clock signal from gating circuit 156 (of FIG. 2) (i.e. the same clock enable signal that enables the I decimator 106 and the output delay element 162 of the Q decimator 116). The output of the accumulator 38 is a digital signal representing a time remaining until the next transmitter synchronized sample. The digital signal from the accumulator 38 contains an integer portion representing the number of I sample times periods until the next transmitter synchronized sample, and a fractional portion representing the additional fraction of an I sample time until the next transmitter synchronized sample.

In the illustrated embodiment, the digital accumulator 38 output signal is a 26-bit fixed point delay representative digital signal with the two most significant bits carrying the integer portion and the remaining bits carrying the fractional portion. One skilled in the art of digital arithmetic circuitry will understand that different accumulator sizes and formats could be used. The accumulator 38 signal is supplied to an integer portion selector 40, which selects the two most significant bits from the signal (bits 0–1). The integer portion is supplied to a comparator circuit 41, which generates a signal when the integer portion is equal to zero. The accumulator 38 signal is also supplied to a fractional portion selector 48 which generates a signal MU containing the ten most significant bits of the fractional portion of the interpolator delay signal (bits 2–11). The MU signal is coupled to the control input terminal of the I interpolator 108 and to the control input terminal of the Q interpolator 118 via the adder 134 (as illustrated in FIG. 1). The full 26-bit accumulator 38 signal is coupled to a second input terminal of the adder 36.

The output of the comparator 41 is applied to a control input terminal of the multiplexer 34 and to a delay element 42. Delay element 42 provides a delay necessary to match the delay between the generation of the interpolator control signal MU and the corresponding output of the phase detector 16 generated in response to that control signal. The output of time delay element 42 is the sample clock enable signal, and is also supplied to a clock input terminal of a modulo-2 counter 44, and to a first input terminal of an AND gate 46. An output terminal of the modulo-2 counter 44 is coupled to a second input terminal of the AND gate 46. The output of AND gate 46 produces the symbol clock enable signal. The modulo-2 counter 44 includes, for example, a D-type flip flop and in this example divides by 2. This operation is used in this application where two samples per symbol are provided. In other applications, such as where four samples per symbol are used, counter 44 would be a modulo-4 counter, and provide a divide-by-4 function.

In operation, the frequency of the fixed frequency decimated sample clock is slightly higher than twice the highest expected transmitter symbol frequency. The system microprocessor computes the nominal or expected sample time period for the symbol rate of the signal currently being received, and loads the nominal delay register 31 with this value. This starts the operation of the NCD circuit 132 at approximately the correct sample period. The phase error detector 126 and associated loop filter 128 cooperate to adjust and lock the NCD circuit 132 to the actual symbol rate of the transmitted signal. The sample clock enable signal from the delay element 42, and the symbol clock enable signal from the AND gate 46 are used by downstream processing elements in the signal processing chain. For example, the pulse shaping filters 110 and 120 (of FIG. 1) receive both the fixed frequency sample clock and the sample enable clock signal.

As described above, the summer 130 (of FIG. 1) produces a digital signal representing the nominal time delay from one transmitter synchronized sample to the next. The NCD accumulator 38 produces a digital signal representing the instantaneous time remaining until the next transmitter synchronized sample time. In the illustrated embodiment these time representative signals are represented by a fixed point 26-bit binary word with the two most significant bits carrying the integer portion, and the remaining bits carrying the fractional portion. The time value represented by these signals is expressed in terms of periods of the fixed frequency decimated sample clock from gating circuit 156 (of FIG. 2). The time representative signal of the illustrated embodiment has a range of from 0 to $4-2^{-24}$. For example, a "1" value represents one period of the fixed frequency decimated sample clock, and has the value 01 0000 0000 0000 0000 0000 $0000_2$, in which the subscript 2 denotes that the value is represented in the base 2, or binary, format.

If the integer portion of the time delay stored in the accumulator 38 is greater than zero, more than one fixed frequency decimated sample period must elapse before the next transmitter synchronized sample is to be taken. In this condition, the output of the comparator 41 is a logic '0' signal. The multiplexer 34 is conditioned by the logic '0' signal at the comparator 41 to couple the −1 valued signal to the adder 36. The adder 36, in turn, adds the −1 signal to (i.e. subtracts one from) the value of the signal in the accumulator 38, and stores the newly decremented value in the accumulator 38. As a result, the value in the accumulator is decremented by 1, and the integer portion of the accumulator 38 value is counted down. In addition, because the output of the comparator 41 is a logic '0' signal, neither the sample clock enable signal nor the symbol clock enable signal (both suitably delayed by the delay unit 42) are active. This continues until the integer portion is zero.

The fractional part of the accumulator 38 value represents the fraction of a fixed frequency decimated sample period until the next transmitter synchronized sample is to be taken. The most significant ten bits of the fractional part (MU) are used to control the I and Q interpolators, 108 and 118, as described above. When there are no further complete fixed frequency decimated sample periods remaining until the next transmitter synchronized sample is to be taken, the integer portion of the signal in accumulator 38 is 0. In this case, the output signal from the comparator 41 is a logic '1' signal.

When the output signal from the comparator 41 is a logic '1' signal, an interpolated sample is taken from the I and Q interpolators, 108 and 118, at an intermediate time controlled by the MU signal portion (i.e. most significant ten bits) of the fractional part of the accumulator 38 value, and a sample clock enable signal is generated to enable the down-stream circuitry to clock in and process this newly generated sample. In addition, the modulo-2 counter 44 is clocked, and, if it is a transmitter symbol time, the AND gate 46 produces a symbol clock enable signal as well.

At the same time, the multiplexer 34 is conditioned to pass the signal from the adder 130 (of FIG. 1) to the adder 36. The adder 36 combines the ideal transmitter synchronized sampling period from the adder 130 with the fractional part from the accumulator 38 (the integer portion is zero, as described above). In this manner, the time remaining until the next transmitter synchronized sample is to be taken is placed in the accumulator 38. The loop is closed by the NCD circuit 132 control signal value changing in response to the phase error detector 126 output signal via the loop filter 128 and adder 130.

Figure 9:
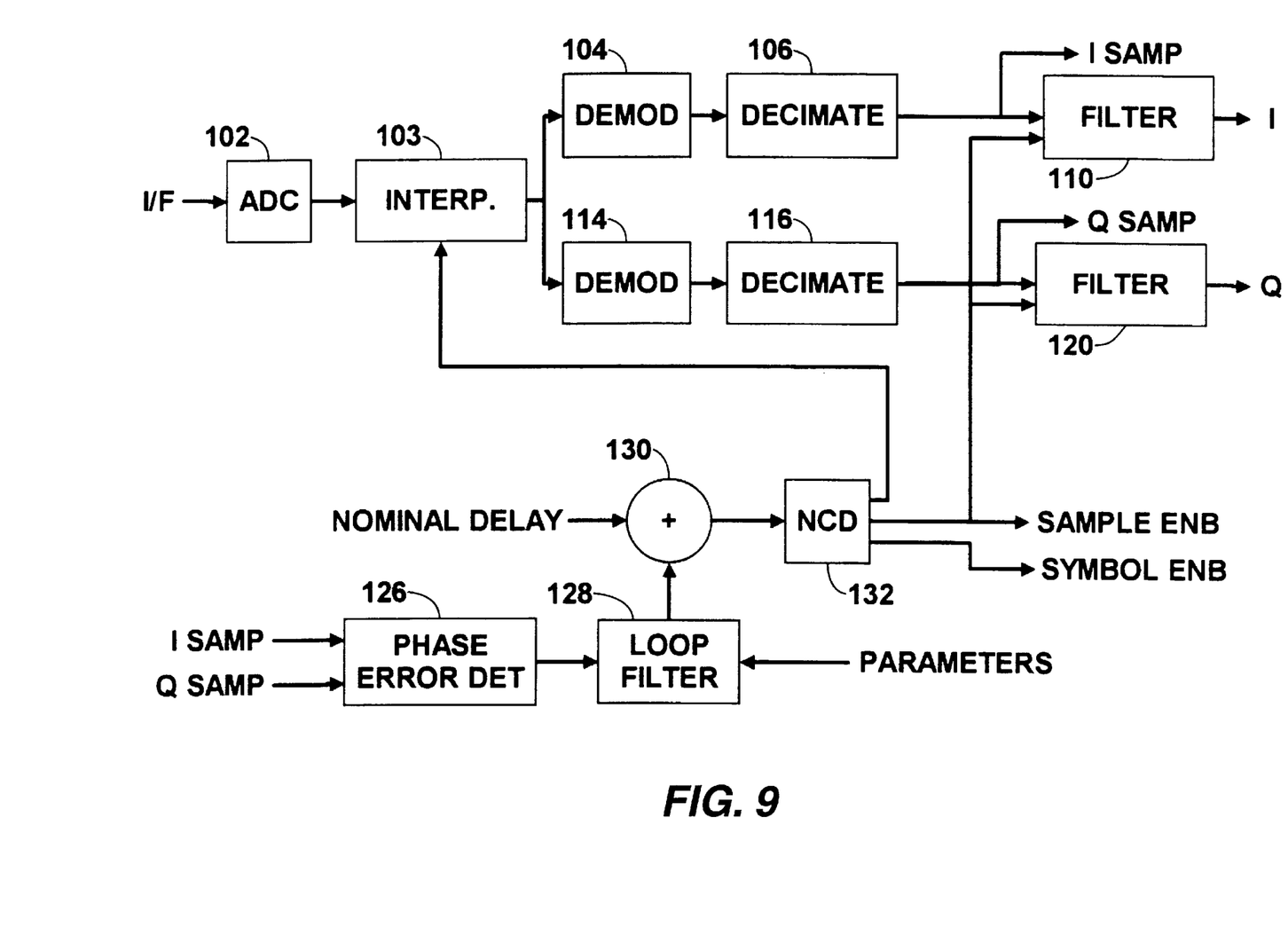
FIG. 9 is a block diagram of an alternate embodiment of a QAM symbol timing recovery system according to the present invention.

FIG. 9 is a block diagram of an alternate embodiment of a QAM symbol timing recovery system according to the present invention. In FIG. 9, those elements which are the same as those illustrated in FIG. 1 are designated with the same reference number, and are not described in detail below. In FIG. 9, the output terminal of the ADC 102 is coupled to an input terminal of an interpolator 103. An output terminal of the interpolator 103 is coupled to the series connection of the I demodulator 104 and the I decimator 106, and to the series connection of the Q demodulator 114 and the Q decimator 116. The output terminal of the I decimator 106 is coupled to the I matched filter 110 and the output terminal of the Q decimator 116 is coupled to the input terminal of the Q matched filter 120. The remainder of the system illustrated in FIG. 9 is the same at the system illustrated in FIG. 1.

In FIG. 9, the interpolator 103 operates in a similar manner to the system of FIG. 1, except that interpolated samples at four times the received QAM subcarrier frequency ($4 \times f_{sc}$), and aligned with the in-phase and quadrature components, are produced by the interpolator 103. In this case, the nominal delay supplied to adder 130 represents the nominal time period between $4 \times f_{sc}$ samples, expressed in terms of a number of cycles of the fixed frequency ADC sampling clock. The NCD circuit 132 produces an interpolator control signal representing the fraction of an ADC sample period until the next $4 \times f_{sc}$ sample occurs. These interpolated samples are supplied to the demodulators 104 and 114, and decimators 106 and 116 to produce the I and Q sample streams.

One skilled in the art will understand that while only a single interpolator 103 is required in the system illustrated in FIG. 9, that interpolator must have better performance, and operate at four times the symbol rate, instead of two times the symbol rate, as in the system of FIG. 1.

What is claimed is:

1. In a receiver receiving a transmitted quadrature amplitude modulated (QAM) signal representing successive symbols, the QAM signal including an in-phase (I) component and a quadrature component (Q), a timing recovery system comprising:

a source of samples representing the QAM signal at a fixed frequency;

processing circuitry for the I component, comprising:
a first demodulator, coupled to the sample source, for demodulating the I component of the QAM signal to baseband; and
a first interpolator, coupled to the first demodulator and responsive to a control signal, for producing I component samples taken at times synchronized to the transmitted symbols;

processing circuitry for the Q component, comprising:
a second demodulator, coupled to the sample source, for demodulating the Q component of the QAM signal to baseband; and a second interpolator, coupled to the second demodulator and responsive to a control signal, for producing Q component samples taken at times synchronized to the transmitted symbols;

a phase error detector, coupled to the first and the second interpolators, for detecting a phase error between the sample times of the transmitter synchronized I and Q samples respectively produced by the first and second interpolators and times of the successive transmitter symbols;

a source of a nominal delay signal;

a summer coupled to the phase error detector and the nominal delay signal source; and a numerically controlled delay circuit, coupled to the summer, for producing the respective control signals coupled to the first and second interpolators.

2. The system of claim 1 further comprising:

a source of a Q component timing correction signal; and a second summer, coupled to the Q component timing correction signal source and between the numerically controlled delay circuit and the second interpolator.

3. The system of claim 1, wherein:

the first demodulator is a +1, 0, −1, 0 demodulator;

the I component processing circuitry further comprises a first decimator, coupled between the first demodulator and the first interpolator, for producing baseband I component samples;

the second demodulator is a +1, 0, −1, 0 demodulator; and the Q component processing circuitry further comprises a second decimator, coupled between the second demodulator and the second interpolator, for producing baseband Q component samples.

4. The system of claim 3, wherein:

the sample source comprises:
an analog-to-digital converter, responsive to the received QAM signal and a clock signal, for generating the QAM signal representative samples; and
a clock signal generator generating the clock signal at a frequency of at least four times the transmitted symbol frequency;

the system further comprises:
a modulo-four counter, coupled to the clock signal generator and having an output terminal producing a signal having a value which is one of 1, 2, 3 and 4;
a first gating circuit, coupled to the modulo-four counter, for producing a gating signal when the value of the signal at the output terminal of the modulo-four counter signal is one of '1' and '3';
a second gating circuit, coupled to the modulo-four canter, for producing a gating signal when the value of the counter signal is one of '2' and '4';

the first decimator comprises a first delay circuit, having a clock input terminal coupled to the clock signal generator, and an enable input terminal coupled to the second gating circuit; and the second decimator comprises:
a second delay circuit, having a clock input terminal coupled to the clock signal generator, and an enable input terminal coupled to the first gating circuit; and
a third delay circuit, having a clock input terminal coupled to the clock signal generator, and an enable input terminal coupled to the second gating circuit.

5. The system of claim 4, wherein:

the first +1, 0 −1, 0 demodulator comprises:

a first four-input multiplexer, having respective data input terminals coupled to respective signal sources having values of 0, +1, 0 and −1 and a control input terminal coupled to the modulo-four counter; and
a first multiplier, coupled to the analog-to-digital converter and the first four-input multiplexer, for producing demodulated I component samples; and the second +1, 0 −1, 0 demodulator comprises:

a second four input multiplexer, having respective data input terminals coupled to respective signal sources having values −1, 0, +1, and 0 and a control input terminal coupled to the modulo-four counter; and
a second multiplier, coupled to the analog-to-digital converter and the second four-input multiplexer, for producing demodulator Q component sample.

6. The system of claim 3, wherein:

the sample source comprises:
an analog-to-digital converter, responsive to the received QAM signal, and a clock signal, for generating the QAM signal representative samples; and
a clock signal generator generating the clock signal at a frequency of at least four times the transmitted symbol frequency;

the system further comprises a modulo-four counter, coupled to the clock signal generator;

the first +1, 0 −1, 0 demodulator comprises:

a first four-input multiplexer, having respective data input terminals coupled to respective signal sources having values of 0, +1, 0 and −1 and a control input terminal coupled to the modulo-four counter; and
a first multiplier, coupled to the analog-to-digital converter and the first four-input multiplexer, for producing demodulated I component samples; and the second +1, 0 −1, 0 demodulator comprises:

a second four input multiplexer, having respective data input terminals coupled to respective signal sources having values −1, 0, +1, and 0 and a control input terminal coupled to the modulo-four counter; and
a second multiplier, coupled to the analog-to-digital converter and the second four-input multiplexer, for producing demodulator Q component samples.

7. In a receiver receiving a transmitted quadrature amplitude modulated (QAM) signal representing successive symbols, the QAM signal including an in-phase (I) component and a quadrature component (Q) modulated on a QAM subcarrier, a timing recovery system comprising:

a source of samples representing the QAM signal at a fixed frequency;

an interpolator, coupled to the sample source, and responsive to a control signal, for producing QAM samples taken at times synchronized to the QAM subcarrier;

a first demodulator, coupled to the interpolator, for demodulating the I component of the QAM signal to baseband;

a second demodulator, coupled to the interpolator, for demodulating the Q component of the QAM signal to baseband;

a phase error detector, coupled to the first and the second demodulators, for detecting a phase error between the sample times of the transmitter synchronized I and Q samples respectively produced by the first and second demodulators and times of the successive transmitter symbols;

a source of a nominal delay signal;

a summer coupled to the phase error detector and the nominal delay signal source; and a numerically controlled delay circuit, coupled to the summer, for producing the control signal coupled to the interpolator.

8. The system of claim 7, further comprising:
a first decimator, coupled to the first demodulator, for producing baseband I component samples; and
a second decimator, coupled to the second demodulator, for producing baseband Q component samples; wherein:
the first demodulator is a +1, 0, −1, 0 demodulator; and
the second demodulator is a +1, 0, −1, 0 demodulator.

9. The system of claim 8, further comprising:
a modulo-four counter, synchronized to the QAM subcarrier synchronized samples from the interpolator, and having, an output terminal producing a signal having a value which is one of 1, 2, 3 and 4;
a first gating circuit, coupled to the modulo-four counter, for producing a gating signal when the value of the signal at the output terminal of the modulo-four counter signal is one of '1' and '3';
a second gating circuit, coupled to the modulo-four canter, for producing a gating signal when the value of the counter signal is one of '2' and '4'; wherein:
the first decimator comprises a first delay circuit, having a clock input terminal coupled to the second gating circuit; and
the second decimator comprises:
a second delay circuit, having a clock input terminal coupled to the first gating circuit; and
a third delay circuit, having a clock input terminal coupled to the second gating circuit.

10. The system of claim 9, wherein:
the first +1, 0 −1, 0 demodulator comprises:
a first four-input multiplexer, having respective data input terminals coupled to respective signal sources having values of 0, +1, 0 and −1 and a control input terminal coupled to the modulo-four counter; and
a first multiplier, coupled to the interpolator and the first four-input multiplexer, for producing demodulated I component samples; and the second +1, 0 −1, 0 demodulator comprises:
a second four input multiplexer, having respective data input terminals coupled to respective signal sources having values −1, 0, +1, and 0 and a control input terminal coupled to the modulo-four counter; and
a second multiplier, coupled to the interpolator and the second four-input multiplexer, for producing demodulator Q component sample.

11. The system of claim 8, further comprising:
a modulo-four counter, synchronized to the QAM subcarrier synchronized samples from the interpolator; wherein:
the first +1, 0 −1, 0 demodulator comprises:
a first four-input multiplexer, having respective data input terminals coupled to respective signal sources having values of 0, +1, 0 and −1 and a control input terminal coupled to the modulo-four counter; and
a first multiplier, coupled to the interpolator and the first four-input multiplexer, for producing demodulated I component samples; and the second +1, 0 −1, 0 demodulator comprises:
a second four input multiplexer, having respective data input terminals coupled to respective signal sources having values −1, 0, +1, and 0 and a control input terminal coupled to the modulo-four counter; and
a second multiplier, coupled to the interpolator and the second four-input multiplexer, for producing demodulator Q component samples.

* * * * *